(12) United States Patent
Zhao

(10) Patent No.: US 7,943,056 B2
(45) Date of Patent: May 17, 2011

(54) TEMPERATURE CONTROL MATERIALS (TCM)

(76) Inventor: Joe R. H. Zhao, Vancouver (CA)

( * ) Notice: Subject to any disclaimer, the term of this patent is extended or adjusted under 35 U.S.C. 154(b) by 240 days.

(21) Appl. No.: 12/428,366

(22) Filed: Apr. 22, 2009

(65) Prior Publication Data

US 2010/0270492 A1    Oct. 28, 2010

(51) Int. Cl.
*C09K 5/00*    (2006.01)
(52) U.S. Cl. ............................................ 252/70; 252/71
(58) Field of Classification Search ................ None
See application file for complete search history.

(56) References Cited

U.S. PATENT DOCUMENTS

| | | | | |
|---|---|---|---|---|
| 3,986,969 A | * | 10/1976 | Telkes | 252/70 |
| 4,287,746 A | * | 9/1981 | Thompson | 72/338 |
| 4,619,778 A | * | 10/1986 | Chalk et al. | 252/70 |
| 4,747,240 A | * | 5/1988 | Voisinet et al. | 52/173.1 |

* cited by examiner

*Primary Examiner* — Necholus Ogden, Jr.

(57) ABSTRACT

The present invention discloses a composition for temperature control and heat storage consisting of sodium sulfate decahydrate, a compound of copolymers, a kind of fibers, a fusion temperature-depressing salt, a nucleating agent, and water, and a method of making it. The composition has high heat storage capacity and temperature control ability of about 35-65 Kwh/$m^3$ within human comfort temperature level of 16 to 28° C., stable and suitable for temperature control and heat storage in buildings and houses.

12 Claims, 3 Drawing Sheets

US 7,943,056 B2

TEMPERATURE CONTROL MATERIALS (TCM)

FIELD OF THE INVENTION

The present invention relates to a composition for temperature control and heat storage comprising sodium sulfate decahydrate, a compound of copolymers, a kind of fibres, a fusion temperature-depressing salt, a nucleating agent, and water, and a method of making it.

BACKGROUND OF THE INVENTION

Energy saving is a big issue nowadays due to the requirement of decreasing use of fossil fuels and required reduction in emission of Green House Gases (GHG) to slow down climate change. Energy saving includes efficient energy use and using renewable energy. Renewable energy sources are those that produce energy without depleting resources. Renewable energy includes solar, wind, water, air, earth and biomass power, and energy from waste. Using renewable energy is the most significant means to reduce GHG and save fossil fuel resources. In the application of renewable energy, a very important aspect is the storage of energy, especially heat storage when applying solar, waste heat, air (air source heat pumps), etc.

The materials used for thermal storage have been developed for decades. Heat storage materials absorb heat through standard heat transfer mechanisms such as radiation, conduction, and convection. As the temperature in environment drops, they subsequently release the stored heat in the same fashion. Active space heating systems commonly use tanks of water or bins of rock as a thermal storage material. Under normal conditions, water has the biggest specific heat capacity of 1.161 wh/(Kg·K) among other materials, so it is the typical heat storage medium in solar water heating systems and other heat storage systems. These heat storage materials deal with "sensible" heat. This means as they absorb heat, their temperature increases and they become hotter.

Another type of thermal storage materials is Phase Change Materials (PCMs) which use the "latent" heat to store thermal energy. Solid-liquid PCMs are conventional and practical PCMs. The thermal energy transfer occurs when a material changes from a solid to a liquid or from a liquid to a solid. This is called a change in state, or "phase". In fact, PCMs use chemical bonds to store and release heat. Initially, these solid-liquid PCMs perform like conventional storage materials; their temperature rises as they absorb heat. Unlike conventional "sensible" heat storage materials, when PCMs reach the temperature at which they change phase (their melting points) they absorb large amounts of heat without increasing temperature. When the temperature in environment around the PCM drops, the PCM solidifies, releasing its stored latent heat. PCMs absorb and release heat while maintaining a nearly constant temperature. Theoretically they can store several times more heat per unit volume than "sensible" heat storage materials such as water and rock.

PCMs can be classified as inorganic PCMs and organic PCMs. Glauber's salt (sodium sulfate decahydrate), calcium chloride hexahydrate, and sodium acetate are the most common inorganic PCMs that are considered to have a possible application. Paraffin wax is the most common organic PCM.

The heat storage materials absorb heat and release heat, so that they can control temperature. Therefore these materials can be referred to as Temperature Control Materials (TCM) based on their functions of temperature control.

Up to now, few PCMs are practically being applied in temperature control and heat storage, especially used in temperature control within the human comfort range of 16 to 28° C. The reasons are mainly:

1. Because the chemicals in inorganic PCMs separate and stratify when in their liquid state, the PCMs have not always re-solidified properly. When temperatures dropped, they did not completely solidify, thus reducing their capacity to store latent heat.

2. A eutectic composition is required to constitute to reach temperature control range of human comfort temperature of 16-28° C.

3. Organic PCMs overcome the disadvantages of inorganic PCMs, but they perform lower latent heats, have high costs and flammable.

Among inorganic PCMs, pure sodium sulfate decahydrate ($Na_2SO_4 \cdot 10H_2O$) possesses a potential latent heat of about 100 Kwh/m$^3$, melting point of 32.4° C., and density of 1.46 g/cm$^3$. In addition, it is inexpensive, available in large quantities and safe to use. Therefore, sodium sulfate decahydrate as a main ingredient would offer the best prospect for possible application in temperature control for human comfort level of 16 to 28° C. In fact, however, sodium sulfate decahydrate as a TCM used in human comfort level has the following problems to be overcome: one problem is its tendency to super-cooling releasing large quantities of heat at undetermined times; second problem is the solid separation of anhydrous sodium sulfate (density of 2.68 g/cm$^3$), consequently reducing ability to store heat. Furthermore, a eutectic composition is required to constitute to reach the temperature of human comfort level.

Super-cooling can be solved by the addition of a nucleating agent such as borax, as disclosed, for example, in U.S. Pat. No. 2,677,664 to Telkes, U.S. Pat. No. 3,986,969 to Telkes, and U.S. Pat. No. 4,237,023 to Johnson et al. Thus, super-cooling temperature can be within the range of human comfort temperature level, therefore it is not an important problem.

Eutectic compositions having melting points at temperature of 16 to 28° C. are not difficult to constitute. It can be done by the addition of fusion (melting) temperature-depressing salts that are generally non-hydrated salts, are conventionally employed in amounts such that the resulting binary system is a eutectic mixture, as disclosed in U.S. Pat. No. 3,986,969 to Telkes, U.S. Pat. No. 4,619,778 to Chalk et al, and U.S. Pat. No. 5,453,213 to Kakiuchi et al. The common fusion temperature-depressing salts are sodium chloride, potassium chloride, ammonium chloride, ammonium sulfate, etc.

The most serious problem is the separation and stratification of solid anhydrous sodium sulfate to form a hard deposit layer when in liquid state such largely reducing formation of decahydrate, then dramatically reducing the heat storage capacity. This problem has been proposed to solve by adding thickening agents, or packaging the composition in thin or shallow containers. For example, U.S. Pat. No. 3,986,969 to Telkes discloses that attapulgus-type clay (magnesium aluminum silicate) is used as a homogenizing or thickening agent. Johnson et al, in U.S. Pat. No. 4,237,023, discloses fumed silicon dioxide is acted as a stabilizing agent, and the composition is packaged in a water vapor-impermeable container in which the thickness is limited to a thickness that allows recrystallization of the composition to occur primarily by diffusion. U.S. Pat. No. 4,273,667 to Kent, et al proposes a hydrogel comprising a water-swollen cross-linked polymer to be used as a thickening agent. U.S. Pat. No. 4,619,778 to Chalk et al also discloses a water-swollen cross-linked polymer hydrogel as a thickening agent. Kakiuchi, et al, in U.S. Pat. No. 5,453,213 claims to use a thickening agent selected from the group consisting of carboxymethyl cellulose, attapulgite clay and water-insoluble hydrogels for their composition. Voisinet et al, in U.S. Pat. No. 4,747,240 discloses that capsules consisting of their composition used as a building material are approximately spherical in shape and of a diameter of about 500 to about 3,000 microns. U.S. Pat. No. 4,287,076 to Babin et al describes that the composition is dispersed in an oil to which an emulsifying agent has been added to prevent from the solid separation and stratification.

Despite the improved ability achieved by a lot efforts in the prior art, these compositions still do not have sufficient retention of heat storage efficiencies to make them practical, such sufficient problems remain that significant application has not occurred.

The following patents and Reference are cited:

| U.S. Pat. Nos.: | |
|---|---|
| 2,677,664 | Telkes |
| 3,986,969 | Telkes |
| 4,237,023 | Johnson et al |
| 4,619,778 | Chalk et al |
| 5,453,213 | Kakiuchi et al |
| 4,273,667 | Kent et al |
| 4,747,240 | Voisinet et al |
| 4,287,076 | Babin et al |

REFERENCES

Bennington, C. P. J., Grace, J. R., and Kerekes, R. J., The yield stress of fibre suspensions. Can. J. Chem. Eng. 68:748 (1990).
Simmonds, G. E., Bomberger, J. D. and Bryner, M. A., Designing nonwovens to meet pore size specifications. J. Engineered Fibers and Fabrics 2(1):1 (2007).
Zhao, R. H., and Kerekes, R. J., The effect of suspending liquid viscosity on fibre flocculation. Tappi J. 76(2):183 (1993).

SUMMARY OF THE INVENTION

The present invention relates to a composition for temperature control and heat storage comprising sodium sulfate decahydrate, a compound of copolymers, a kind of fibres, a fusion temperature-depressing salt, a nucleating agent, and water.

The present invention also discloses a method of making the composition. The method consisting of the steps: (1) Preparing an aqueous solution of compound of copolymers at a concentration of 1% to 2% by weight. (2) Mixing solid, powdered sodium sulfate, fusion temperature-depressing salt, borax and water to form a paste mixture A. (3) Mixing the aqueous solution of compound of copolymers with the paste mixture A to form a mixture B. (4) At a temperature of 28-35° C., mixing the mixture B with a kind of fibres to form the composition. Eutectics of sodium sulfate decahydrate ($Na_2SO_4 \cdot 10H_2O$) and the fusion (melting) temperature-depressing salt are formed in the composition.

The composition disclosed in the present invention has high heat storage capacity and temperature control ability of about 35-65 Kwh/$m^3$ within human comfort temperature level of 16-28° C., stable and suitable for temperature control and heat storage in buildings and houses.

DETAILED DESCRIPTION OF THE INVENTION

Figure 1:
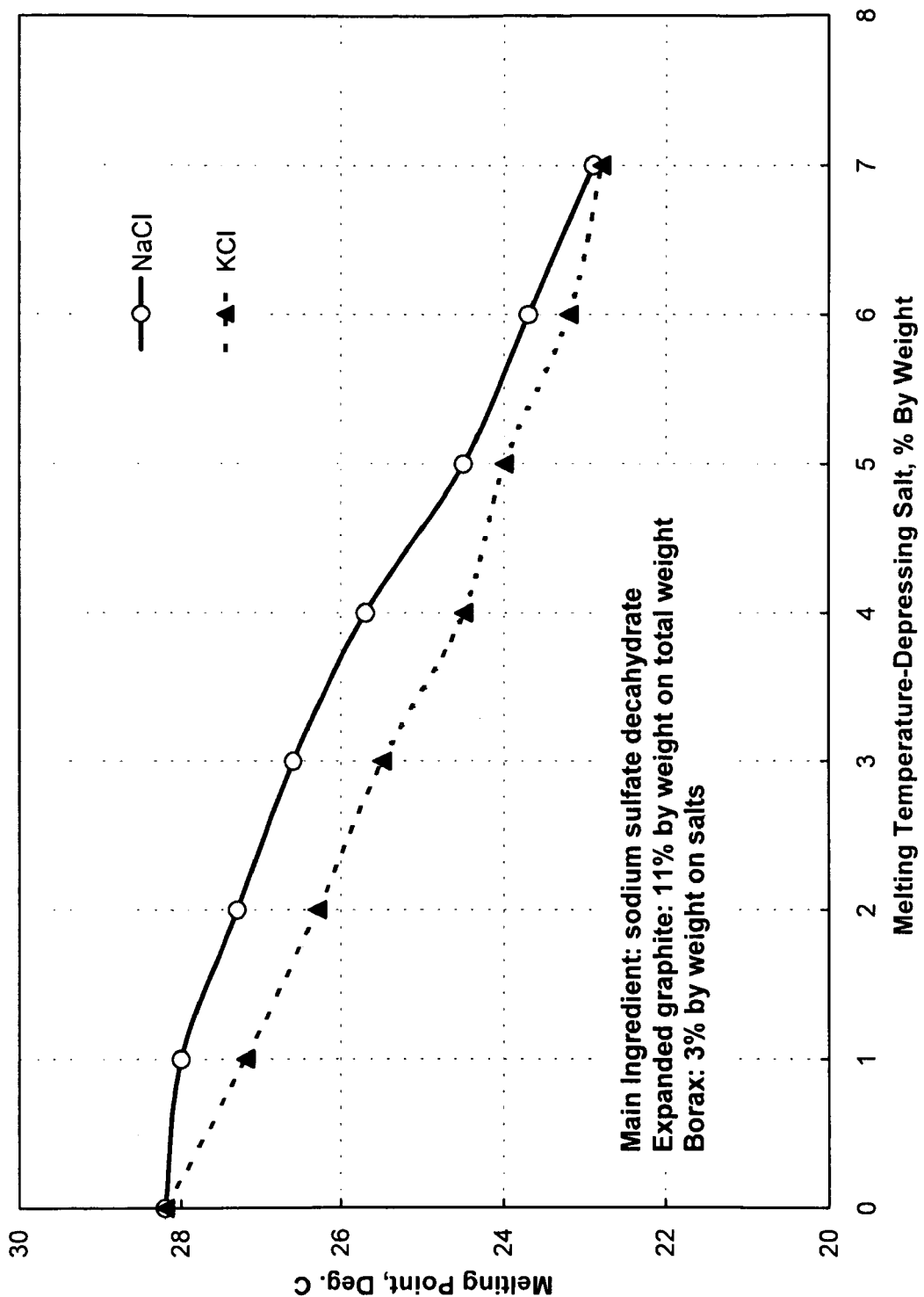
FIG. 1 gives the effect of fusion (melting) temperature-depressing salts on melting points of eutectics in which sodium sulfate decahydrate is the main ingredient.

The present invention relates to a composition for temperature control and heat storage comprising sodium sulfate decahydrate, a compound of copolymers, a kind of fibres, a fusion (melting) temperature-depressing salt, a nucleating agent, and water, and a method of making it.

The most serious problem in the application of sodium sulfate decahydrate as a main ingredient for heat storage and temperature control is the separation and stratification of solid anhydrous sodium sulfate to form a hard deposit layer when in liquid state such largely reducing formation of decahydrate, then dramatically reducing the heat storage capacity. Although the prior art discloses the improved ability, sufficient problems remain so that significant application has not occurred. Using thickening agents to prevent solids from separation and stratification is based on the mechanism that high viscosity of media can reduce settling velocity of solid particles. However, the settling potential of solid sodium sulfate is in a quite large quantity (density of 2.68 g/$cm^3$), very slow settling still exists. In addition, during the practical application, the viscosity of the thickening agent will largely decrease while the temperature increases. Such, the settling velocity of solid will increase. This is the main problem that causes the reduction of heat storage capacity. Packaging the composition in thin or shallow containers may reduce the thickness of the deposit layer of solids after settling. If the thickness is small enough, the problem could partially be solved.

To completely prevent solids from separation and stratification, a network with mechanical strength to support the composition in micron sizes is required. Fibres from natural sources such as virgin wood fibres, wastepaper fibres, cotton fibres, or fibres from man-making or synthesis such as nylon, glass fibres, carbon fibres, have tendency of flocculation at consistency of more than about 0.5% by weight in water. At higher consistencies in water, the flocculated fibres form fibre networks and have certain mechanical strength. For example, for newsprint thermo mechanical pulp (TMP) fibres, the yield stress to resist initial movement of the fibre networks is of the order of $1.38 \times 10^7 C^{3.56}$ (N/$m^2$), where C is consistency of fibre fraction. The longer, the stiffer the fibres, the stronger networks can be formed. The measured mean flow pore diameters ranged from 1.3 to 52.8 microns in the fibre network with fibre diameters of 0.3 to 6.6 microns at a consistency of about 3% by weight. The uniform fibre networks with fibres diameters of about 20-30 microns at a consistency of about 10% by weight in water would constitute pores at sizes of about 30-70 microns, at a consistency of about 20% in water the pore sizes would be about 10-40 microns. The micron size of pores in fibre networks and its mechanical strength can support the particles and prevent them from free flowing including settling by gravity.

Because of the flocculation of fibres at a high consistency, the dispersion of fibres to form uniform networks in the present invention is achieved by the addition of an aqueous compound of copolymers of acrylamides and sodium acrylates. The compound has a high extensional viscosity. Extensional viscosity (also known as elongational viscosity) is a viscosity coefficient when applied stress is extensional stress. For a Newtonian Fluid, the elongational viscosity is three times the shear viscosity. For example, for water, at 20.2° C., shear viscosity is 0.001 Ns/m$^2$, and extensional viscosity is 0.003 Ns/m$^2$. For Non-Newtonian Fluids such as polymer solutions, the extensional viscosity will change with extensional rate in an extensional flow. It has been postulated that fluid of high extensional viscosity can help particle dispersion to form a uniform suspension. The compound of copolymers of acrylamides and sodium acrylates used in the present invention is compound of copolymers having long chain backbones with plenty of branches, molecular weight being more than 1 millions. In an aqueous solution, the compound forms micro networks to demonstrate a high extensional viscosity. The usage is at 0.2% to 3% by weight depending on the requirement of dispersion and uniformity of the fibre network. In most cases in the invention, a concentration of 1% to 2% is preferred.

Adjustment of the melting temperature by fusion (melting) temperature-depressing salts in a composition with sodium sulfate decahydrate was proposed in the prior art, but it is, in fact, not clear. The description of eutectic amount on eutectic transformation temperature in U.S. Pat. No. 4,619,778 to Chalk et al might be correct when used in the cases under their conditions.

Tests were conducted to obtain a clear relation between content of fusion (melting) temperature-depressing salts and eutectic temperature. Two salts, sodium chloride and potassium chloride, have been tested. The results are shown in FIG. 1. Expanded graphite was used to increase thermal conductivity of the eutectic systems for easily identifying the melting points. 3% of borax and impurity depressed the melting point from 32.4° C. of pure sodium sulfate decahydrate to 28.2° C. The effect of NaCl and KCl on melting points of the eutectic systems is nearly linear. From the test results, the composition of the present invention is constituted to contain 3% to 9% of fusion (melting) temperature-depressing salts to reach the human comfort temperature level of 16-28° C.

The uniform dispersion of the salt solids, sodium sulfate, NaCl or KCl, and borax is very important. The aqueous compound of copolymers of acrylamides and sodium acrylates is also used for this purpose.

The process of preparing the composition comprises the following steps:

1 Preparing 1% to 2% of aqueous solution of compound of copolymers of acrylamides and sodium acrylates. At room temperature, the powder copolymer is slowly added to water with agitating at about 30-60 rpm. A normal blade of agitator should be used as in common polymer solution preparation. It may take one to two hours.

2. At room temperature, mixing solid powdered sodium sulfate, fusion (melting) temperature-depressing salt, borax and water to form a paste mixture A. A mixer with function of solid dispersion is useful in this step. This step may take several minutes.

3. At room temperature or better at temperature of 28-35° C., mixing the aqueous solution of compound of copolymers with the paste mixture A to form a mixture B. A mixer or kneader with kneading function to provide sufficient extensional stress to form uniform mixture is required in this step. This step may take several minutes to 30 minutes depending on the kneading effect.

4. At temperature of 28-35° C., mixing the mixture B with fibres to form the composition in the present invention. A mixer with kneading function (a kneader) to provide sufficient extensional stress to form uniform composition is required. This step may take several minutes to 30 minutes depending on the kneading effect. Longer kneading is recommended in this step.

To demonstrate the effectiveness of the composition in the present invention and the method of making it, the following example shows the detail. The formulation of the composition and method and process of making it in the present invention are not limited to this example.

A composition in the present invention is formulated as shown in Table 1.

TABLE 1

Formulation of a Composition in the Present Invention

| Ingredients | Weight | Weight % | Remarks |
|---|---|---|---|
| Sodium sulfate | 44 Kg | 31.7 | Industrial grade |
| NaCl | 9 Kg | 6.5 | Industrial grade |
| Borax | 6 Kg | 4.3 | Industrial grade |
| Natural fibres | 10 Kg | 7.2 | Recycled office and newsprint wastepaper |
| Copolymer | 1 Kg | 0.7 | PolyWeb P30 provided by Tri-Y Enterprises Ltd. |
| Water | 69 Kg | 49.6 | Tap water (Canadian potable water) |
| TOTAL | 139 Kg | 100 | |

49 Kg of water is used to prepare 2% by weight of aqueous solution of PolyWeb P30. 15 Kg of water is used to prepare the paste mixture A of solid salts. Remaining 5 Kg of water is added to the fibres before the addition of the mixture B to form the composition.

Following the process and method as described above to make the composition. The performance and heat enthalpy of the composition were then investigated. The total heat enthalpy and averaged specific heat capacity of the composition at temperature between 16 to 28° C. compared to water and rock are listed in Table 2.

TABLE 2

Total Enthalpy and Averaged Specific Heat Capacity at 16-28° C.

| Materials | Density (Kg/m$^3$) | Total enthalpy (heating) | Averaged specific heat capacity (heating) | Total enthalpy (cooling) | Averaged specific heat capacity (cooling) |
|---|---|---|---|---|---|
| The composition | 1,380 | 50 Kwh/m$^3$ | 4.17 Kwh/(m$^3$ · K) | 58 Kwh/m$^3$ | 4.83 Kwh/(m$^3$ · K) |

TABLE 2-continued

Total Enthalpy and Averaged Specific Heat Capacity at 16-28° C.

| Materials | Density $(Kg/m^3)$ | Total enthalpy (heating) | Averaged specific heat capacity (heating) | Total enthalpy (cooling) | Averaged specific heat capacity (cooling) |
|---|---|---|---|---|---|
| Water | 1,000 | 13.93 Kwh/$m^3$ | 1.161 Kwh/($m^3 \cdot K$) | 13.93 Kwh/$m^3$ | 1.161 Kwh/($m^3 \cdot K$) |
| Rock | 2,240 | 7.46 Kwh/$m^3$ | 0.622 Kwh/($m^3 \cdot K$) | 7.46 Kwh/$m^3$ | 0.622 Kwh/($m^3 \cdot K$) |

The heat storage capacity of the composition at 16-28° C. in the example is 3.6 times of water, and 6.7 times of rock.

Figure 2:
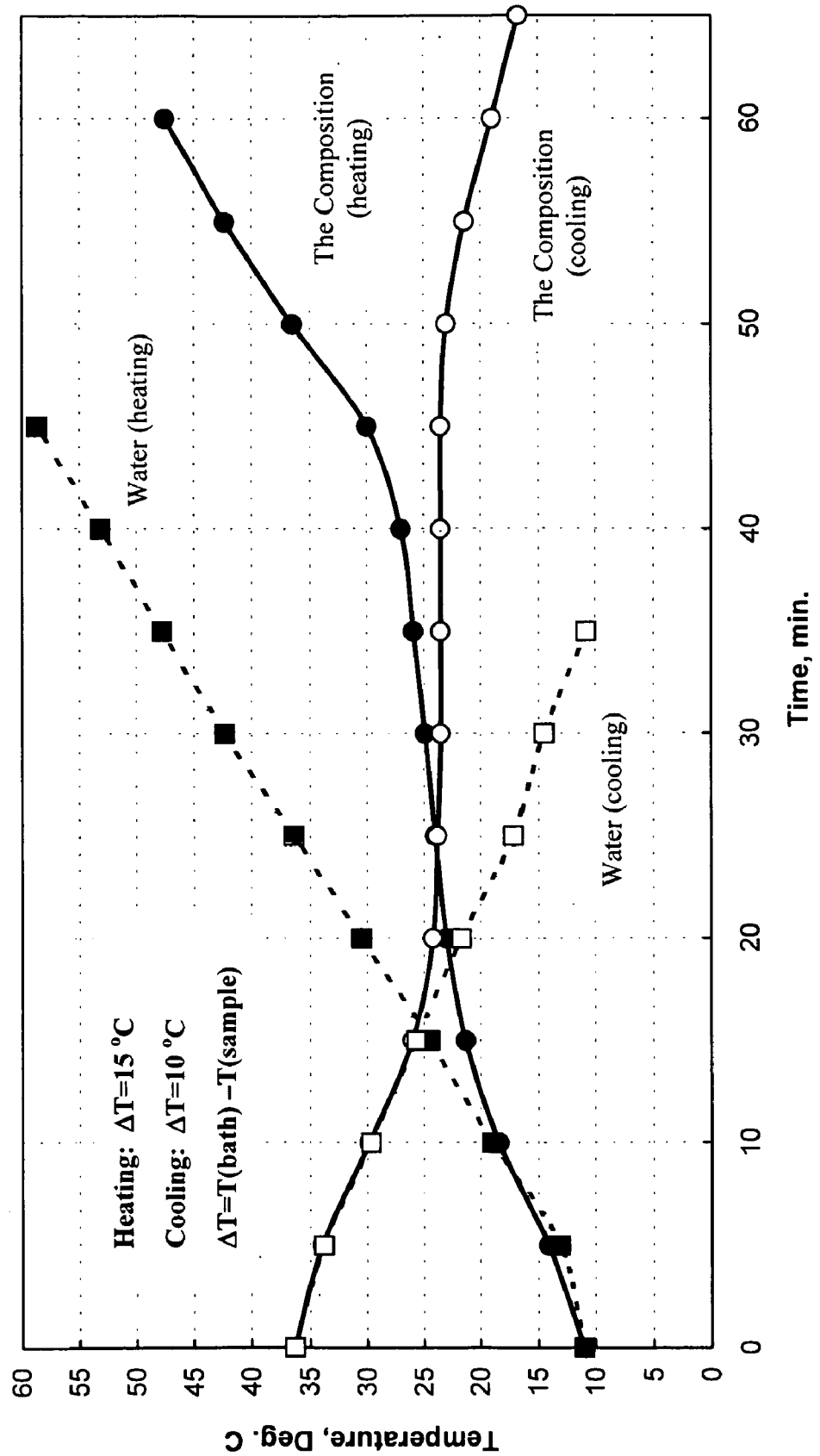
FIG. 2 shows the temperature curves of the composition in the present invention and water sample during heating or cooling at constant temperature differences between water bath and sample being tested. The temperature difference of 15° C. was kept during heating; the temperature difference of 10° C. was kept during cooling.
Figure 3:
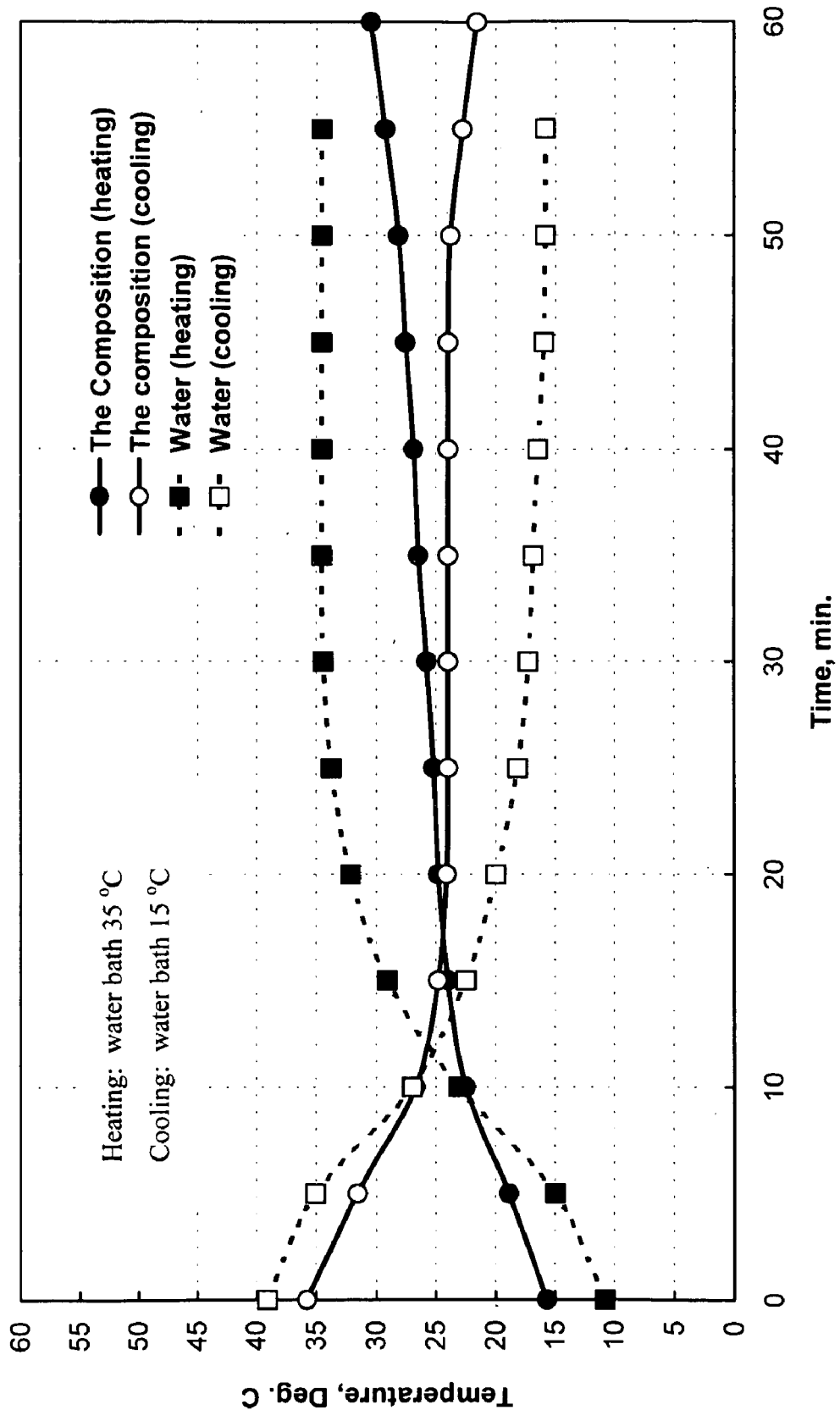
FIG. 3 shows the temperature curves of the composition in the present invention and water sample during heating or cooling at constant temperatures in water bath. The temperature of 35° C. in the water bath was kept during heating, and the temperature of 10° C. in the water bath was kept during cooling.

The temperature curves of the composition sample and water sample during heating and cooling are given in FIG. 2 and FIG. 3. Same volumes of the composition sample and water sample in the same container were tested for comparison. To protect the convection heat transfer during the tests in the water sample, the same natural fibres as used in the composition were put in the water sample being tested. A water bath was used as a heating or cooling source. FIG. 2 is the case of a constant temperature difference between the water bath and samples. During heating, the temperature difference ΔT=15° C. was kept. During cooling, the temperature difference ΔT=10° C. was kept. FIG. 3 shows the case of heating or cooling on the samples at a constant temperature in the water bath. During heating, the water bath temperature was 35° C., and during cooling the temperature in the water bath was 15° C.

As seen from FIG. 2, the temperature of water sample increases with time linearly during heating, and decreases with time linearly during cooling. In contrast, the temperature of the composition, during heating, increases almost linearly at the beginning, and slowly increases at temperature between about 16° C. and 28° C., at higher than 28° C., increases linearly. The temperature of the composition, during cooling, decreases almost linearly at the beginning, and very slowly decreases at temperature between about 26° C. and 23° C., at lower than 23° C., decreases linearly. FIG. 3 shows that the temperature of water sample increases (when heating) or decreases (when cooling) very fast to reach the temperature near the water bath. In contrast, the temperature curves of the composition during heating and cooling are nearly the same as in FIG. 2.

The tested results have proven that the composition can control temperature in the range between 16-28° C. The tested temperature curves also show that the composition does not have a fixed melting point as PCMs. This is caused by the non-uniform distribution of the fusion (melting) temperature-depressing salt in the pores of the fibre networks. This constitutes a lot of melting points within a temperature range of 16-28° C., or probably within a wider or narrower temperature range. This property benefits to the temperature control within the human comfort temperature level of 16-28° C. In the cases of PCMs, if the temperature fluctuation did not go across the melting point, PCMs can not use latent heat to store or release heat, only can sensible heat be functioned. Sensible heat of PCMs is in a very small amount so that it has little capacity to control temperature and store heat.

The example above only demonstrates a part of the present invention. The composition can be formulated within a range as shown in Table 3.

TABLE 3

Formulation of the Composition in the Present Invention

| Ingredients | Weight % |
|---|---|
| Sodium sulfate | 25-40 |
| NaCl (KCl or other fusion temperature depressing salts) | 3-9 |
| Borax | 2-5 |
| Natural fibres (or man-made fibres) | 5-20 |
| Copolymer | 0.2-3 |
| Water | 40-65 |

The total heat enthalpy of the composition formulated from Table 3 at temperature 16-28° C. is in the range of 35-65 Kwh/$m^3$, averaged heat capacity is in the range of 2.92-5.42 Kwh/($m^3 \cdot K$).

After a long period of more than hundreds of repeated cycles of heating and cooling, no change of performance and property of the composition has been observed. The composition in the present invention is stable and suitable for temperature control and heat storage in buildings and houses for a long term to save space heating/cooling energy.

Although preferred embodiments have been described and depicted in detail herein, it will be apparent to those skilled in the relevant art that various modifications, additions, substitutions, and the like can be made without departing from the spirit of the present invention and these are therefore considered to be within the scope of the present invention as defined in the claims which follow.

What is claimed is:

1. A composition for temperature control and heat storage consisting of
    sodium sulfate decahydrate,
    a compound of copolymers, said the compound of copolymers being copolymers of acrylamides and sodium acrylates at 0.2% to 3% by weight to the composition, fibres,
    a fusion temperature-depressing salt,
    a nucleating agent, said the nucleating agent being borax, and water.

2. A composition according to claim 1 wherein the sodium sulfate decahydrate is 25% to 40% by weight to the composition.

3. A composition according to claim 1 in which said fibres is natural fibres.

4. A composition according to claim 1 in which said fibres is man-made fibres.

5. A composition according to claim 1 wherein the fibres is 5% to 20% by weight to the composition.

6. A composition according to claim 1 wherein the fusion temperature-depressing salt is one or a mixture selected from sodium chloride, potassium chloride, ammonium chloride and ammonium sulfate.

7. A composition according to claim 1 wherein the fusion temperature-depressing salt is 3% to 9% by weight to the composition.

8. A composition according to claim 1 wherein the nucleating agent is 2% to 5% by weight to the composition.

9. A composition according to claim 1 wherein the water is 40% to 65% by weight to the composition.

10. A method of preparing the composition for temperature control and heat consisting of comprising the steps of
   (1) Preparing an aqueous solution of a compound of copolymers of acrylamides and sodium acrylates at a concentration of 0.2% to 3%.
   (2) Mixing solid, powdered sodium sulfate, fusion temperature-depressing salt, borax and water to form a paste mixture A.
   (3) Mixing the aqueous solution of compound of copolymers with the paste mixture A to form a mixture B.
   (4) Mixing the mixture B with fibres to form the composition at a temperature of 28-35° C.

11. A method according to claim 7 wherein water content of the fibres is 1% to 15% by weight.

12. A method according to claim 7 wherein sodium sulfate and water form sodium sulfate decahydrate, and eutectics of sodium sulfate decahydrate and the fusion temperature-depressing salt are formed in the composition.

* * * * *